United States Patent [19]
Temple

[11] Patent Number: 5,875,342
[45] Date of Patent: Feb. 23, 1999

[54] USER PROGRAMMABLE INTERRUPT MASK WITH TIMEOUT

[75] Inventor: Joseph L. Temple, Hurley, N.Y.

[73] Assignee: International Business Machines Corporation, Armonk, N.Y.

[21] Appl. No.: 868,400

[22] Filed: Jun. 3, 1997

[51] Int. Cl.$^6$ .............................. G06F 9/46; G06F 13/14
[52] U.S. Cl. ...................... 395/733; 395/735; 395/869
[58] Field of Search .................................. 395/733, 735, 395/739, 869, 868

[56] References Cited

U.S. PATENT DOCUMENTS

| | | | |
|---|---|---|---|
| 4,099,255 | 7/1978 | Stanley et al. | 395/735 |
| 4,574,350 | 3/1986 | Starr | 395/726 |
| 5,530,874 | 6/1996 | Emery et al. | 395/735 |
| 5,588,125 | 12/1996 | Bennett | 395/306 |
| 5,740,451 | 4/1998 | Mukaki et al. | 395/733 |

OTHER PUBLICATIONS

"Enterprise Systems Architecture/390 Principles of Operation", IBM Publication, SA22–7201–04, Jun. 1997.

*Primary Examiner*—Gopal C. Ray
*Attorney, Agent, or Firm*—Marc. A. Ehrlich

[57] ABSTRACT

A method and apparatus for implementing a user programmable interrupt mask and timeout count. A master mask latch receives non-privileged instructions which alternatively cause the latch to disable and enable interrupt requests for the processor. The non-privileged disable interrupts instruction additionally causes the initiation of a timeout counter for defining the duration of an interval for which interrupt requests may be disabled. The non-privileged enable interrupts instruction additionally terminates the count of the timeout counter. If the timeout counter is not halted within the defined interval, a system error interrupt is generated, interrupts are re-enabled and the counter is halted. In a further embodiment, the disable interrupts instruction may be incorporated into a fetch and hold instruction and the enable interrupts instruction may be incorporated into a store and release instruction to facilitate atomic read, modify, write operations.

20 Claims, 6 Drawing Sheets

USER PROGRAMMABLE INTERRUPT MASK WITH TIMEOUT

CROSS REFERENCE TO RELATED APPLICATION

This invention is related, and cross-reference may be had to the U.S. patent application entitled User Programmable Interrupt Mask with Timeout For Enhanced Resource Locking Efficiency, by the present inventor assigned to the present assignee and accorded Ser. No. 08/868,352, filed concurrently herewith.

FIELD OF THE INVENTION

The present invention generally relates to the field of interrupt processing, and particularly to a programmable interrupt mask which may be set and reset by the user and which in turn sets and resets a timeout counter. The invention permits a user to mask interrupts for a predetermined time period thereby enabling the uninterrupted execution of a kernel of instructions, as well as permitting the user to remove the programmed interrupt mask within the predetermined time period. The timeout feature of the invention subsequently removes the mask if the user has failed to do so within the predetermined time period by enabling an error interrupt after a timeout counter overflow forces an error.

BACKGROUND OF THE INVENTION

Typical computer systems include a variety of constituent parts such as microprocessors, memories, peripheral devices, and device controllers. During the normal operation of such a computer system, utilization of some or all of these resources may be required for the successful completion of a given task. For example, in a single processor system running multiple programs, each executing program may simultaneously seek the use of the single processor resource. Alternatively, in multiprocessor systems, two or more of the processors may concurrently seek access to the same memory resource.

When simultaneous access to a shared resource is requested, errors are likely to occur. For example, incorrect data may be retrieved from a shared memory device or a shared processor may execute an incorrect sequence of instructions. To avoid such undesired consequences, serialization of these shared resources is necessary. Moreover, within such a serially reusable resource (SRR), certain operations performed thereupon require uninterrupted execution. These so-called atomic operations require means for permitting their unimpeded progression toward completion. For example, in operations involving queue pointer manipulation which are required for enqueueing or dequeueing of data, it is important to the integrity of the queue that the instructions proceed without interruption to their conclusion.

Typically, computer systems have provided serialized resource utilization via the implementation of shared resource locking techniques. Shared resource locks, which can be implemented via hardware or software, effectively disable the access of other devices to a shared resource while it is in use by a first device. For example, U.S. Pat. No. 4,574,350 issued to Starr for Shared Resource Locking Apparatus, teaches a hardware-based locking unit which permits exclusive access to a shared resource via the issuance of a memory read command from the requesting device, and terminates the exclusive resource access via a memory write command therefrom. While such resource locking schemes are generally effective in serializing access to an SRR they do not address the need for providing atomic execution of certain operations.

Interrupt masking schemes have also been used to provide uninterrupted execution of operations. For example, the publication entitled Enterprise Systems Architecture/390 Principles of Operation, (pp. 6-2–6-6 Copyright International Business Machines Corporation, 1990, publication reference no. SA22-7201-00) generally describes a mechanism for enabling and disabling interrupt requests by setting mask bits in the currently executing program status word (PSW) and in the control registers of the central processing unit (CPU) (Enterprise Systems Architecture/390 is a trademark of International Business Machines Corporation). When a PSW mask bit is set to one for a particular type of interrupt, the interrupt request type is enabled, and these interruptions can occur (i.e. requests for these types of interrupts are granted access to the CPU). Alternatively, when a PSW mask bit is set to zero for a particular interrupt type, the interrupt request type is disabled, and the conditions causing these interruptions will generally remain pending (i.e. the requests are not forwarded to the CPU) thereby allowing an operation to continue through to its completion without these types of interruptions.

During the time interval for which interrupt requests are disabled, exceptions in the processing of an operation may occasionally cause the system to freeze. For example, such conditions may include a system deadlock due to unresolved contention for use of a shared resource. If the operation being performed while interrupt requests are disabled freezes, it follows that the system cannot regain control of the processor by means of an interrupt request, and consequently, the system cannot continue processing. Accordingly, there is requirement for a timer mechanism for re-enabling interrupt requests after a predetermined elapsed time. The elapsed time should be set so as to far exceed the normal time interval required for the completion of the operation being executed while the interrupt requests are disabled.

Such a timer mechanism, often described as a watchdog timer, is described in the Enterprise Systems Architecture/390 Principles of Operation, (pp. 6–11) which explains that the CPU timer measures elapsed CPU time and causes an interruption of the processing sequence when a specified amount of time has elapsed via an external interrupt request. The timer may be set to an initial value by executing the SET CPU TIMER instruction, a privileged instruction which is executed by the system and cannot be executed by a user. This precaution is typically implemented to assure the integrity of the system. If the value of the timeout counter were programmable by a user, that user could effectively permanently disable interrupt requests by setting a very high timer value, which would undermine the function of the computer system. Thus, a user seeking to disable interrupt requests and simultaneously initiate the watchdog timer cannot do so in a single instruction within this architecture. The SET CPU TIMER operation is not accessible to the user and as a result, the user wishing to disable interrupt requests for a period bounded by a watchdog timer is required to wait for the system execution of the set timer instruction, this implementation, while advantageous in ensuring system integrity, wastes valuable instruction cycles.

From the foregoing it can be seen that it would be useful to permit a user to programmably disable interrupt requests to assure the atomicity of a kernel of instructions and to simultaneously start a watchdog timer counting for a pre-established time period corresponding the duration of the user implemented disabling of interrupt requests, and wherein the preestablished time period is not accessible to the user. It is further desirable within such a system to provide programmable means for re-enabling the disabled interrupt requests within the predetermined time period and to provide a system level override which re-enables interrupt requests if the predetermined time period has expired without having the interrupt requests re-enabled by the user. With such a solution, a user would be permitted to mask interrupts for a controlled period of time. Advantageously, the user could use such a programmable interrupt mask to ensure atomicity of operations in a single processor system and enhance resource locking in multiprocessor systems.

SUMMARY OF THE INVENTION

The foregoing problems and shortcomings of the prior art are overcome and additional advantages are provided by the present invention wherein is described a system and method for permitting a user to implement and remove an interrupt mask for disabling interrupt requests while concurrently allowing the user to start and stop a timeout counter. The timeout counter is set to a preestablished value, and upon exceeding the preestablished value, an error signal is generated via comparator logic, the error signal serves as a system error interrupt which interrupts the processing of the CPU and removes the interrupt mask if the mask is left in place for too long.

An interrupt control system according to the present invention comprises interrupt hardware including an interrupt master masking means, which when reset, allows all interrupts to occur, and when set, allows only system error interrupts to occur, effectively disabling all other interrupt requests, and a timeout counter which may be set at a preestablished timer value to as to limit the amount of time that the interrupt master masking means can disable interrupt requests. The computer system further includes means for receiving an instruction which allows a user program (i.e. a non-privileged program) to set the interrupt mask while also setting and starting the timeout counter, and an instruction permitting a user program to reset the interrupt mask and stop the timeout counter.

In an embodiment of the invention, the interrupt hardware further includes a register for storing an initial preestablished value for the timeout counter. This initial value is provided to the timeout counter via a privileged program upon initialization of the computer system so as to ensure that a user does not set the timeout counter with an unreasonably large value. The interrupt control system further includes clocking means for generating a signal for stepping the timeout counter, wherein the counter signal may be synchronized with the machine cycle of the computer system.

The interrupt control system according to an embodiment of the present invention further comprises means for examining the timeout counter to determine when its count has exceeded the limit set by the initial value, and means responsive to the examination means for generating an error signal if the timeout counter has exceeded the initial value limit.

The inventive interrupt control system additionally includes means responsive to the generation of the error signal for resetting the interrupt mask and for generating an system error interrupt in accordance with the protocol of the computer system.

A further embodiment of the inventive interrupt control mechanism may be incorporated into a reduced instruction set computer system (RISC) to enhance the performance of atomic read-write-modify operations. In an exemplary RISC system the combination of the disable interrupt instruction with the fetch and hold instruction produces a single machine cycle fetch, hold and disable interrupts instruction for fetching data, locking a shared resource location, disabling interrupt requests and starting a timeout counter. Additionally, the store and release instruction may be combined with the enable interrupts instruction to enable a single machine cycle instruction wherein modified data is restored in the shared resource location, the location is unlocked, interrupt requests are re-enabled and the timeout counter is halted.

BRIEF DESCRIPTION OF THE DRAWINGS

The subject matter which is regarded as the invention is particularly pointed out and distinctly claimed at the conclusion of the specification. The foregoing as well as other features and advantages of the invention will be apparent from the following detailed description in conjunction with the accompanying drawings, in which:

DETAILED DESCRIPTION OF THE PREFERRED EMBODIMENTS OF THE INVENTION

Figure 1:
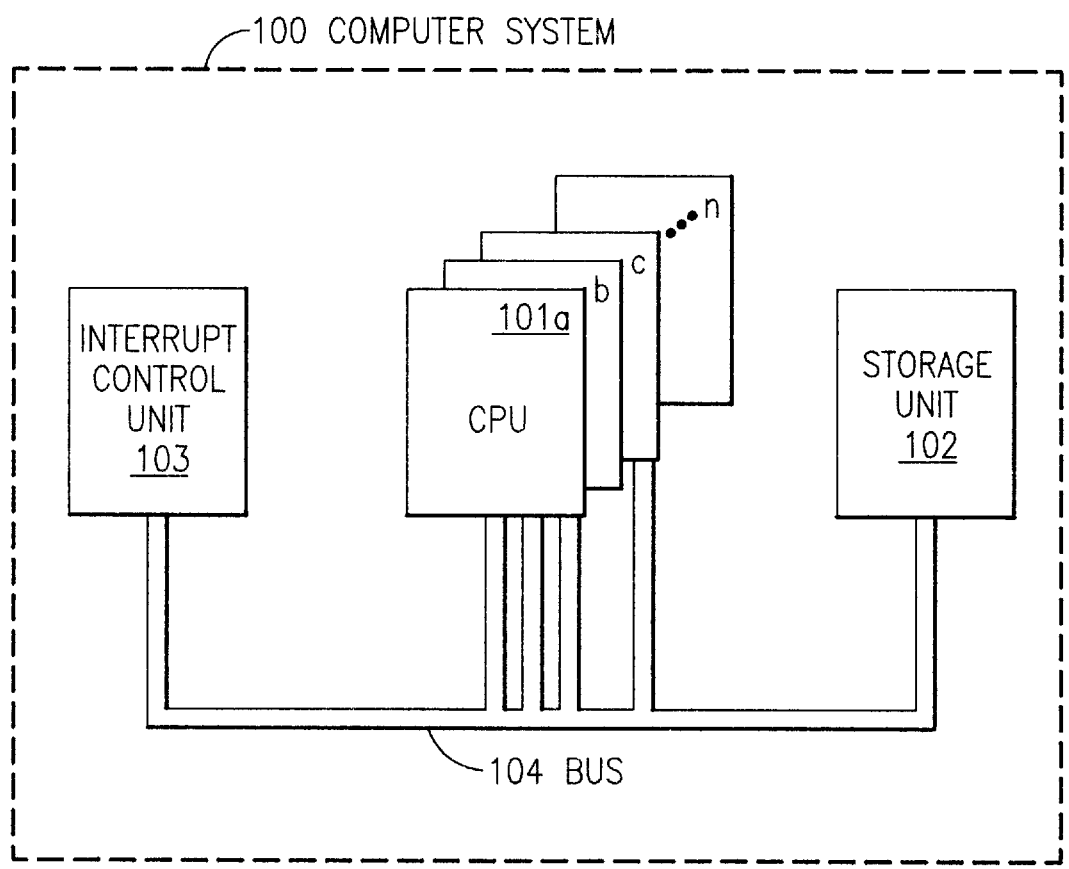
FIG. 1 Depicts a typical computer system including a central processing unit, memory and an interrupt control unit.

A typical computer system 100 including CPUs 101 wherein a system may include one or more CPUs (CPUs 101a through 101n for example in a multiprocessor system), a storage unit 102 and an interrupt control unit 103 is illustrated in FIG. 1. A bus 104 interconnects the various computer system 100 elements to permit data and commands such as interrupt requests to be communicated therebetween. The interrupt control unit 103 selectively permits or denies interrupt requests generated by the computer system 100 from interrupting the sequential processing of the CPU 101.

Interrupt requests may be generated for a variety of reasons and these different classes of interruptions are typically assigned different priority levels. For example, interrupt requests such as: I/O-based interrupt requests which may be generated in response to changes in the status of an I/O operation, timer interrupts which may be generated to update the time of day (TOD) clock function in the computer, and program interrupts which may be generated to indicate errors occurring in the processing of a program are all typically accorded a lower priority and may be pre-empted by a system error interrupt or so-called machine check interrupt request indicating a major system malfunction. Strategies for arbitration among competing, co-pending interrupt requests may include the assignment of an priority scheme, or implementation of a first-come first-served scheme. Moreover, prioritization of co-pending interrupt requests may include pre-emptive prioritization wherein a subsequent, higher priority interrupt request may pre-empt the processing of an earlier received lower priority request. These implementations are well known to those of skill in the art and have different advantages which are dependent upon the systems in which they are being implemented.

Figure 2:
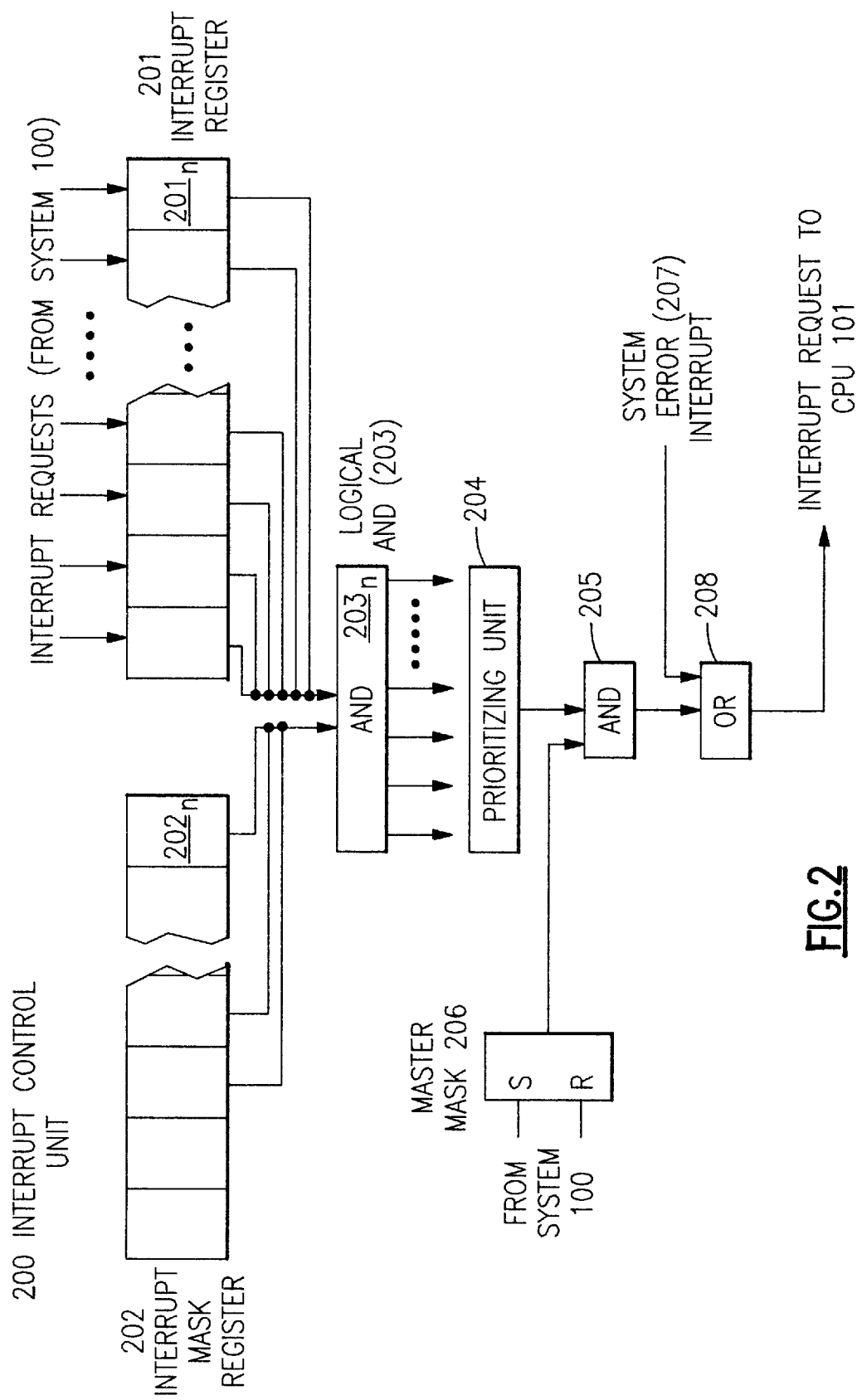
FIG. 2 Generally depicts an interrupt control unit including interrupt masking means and priority control.

Turning now to a more detailed examination of interrupt processing, FIG. 2 generally depicts a typical interrupt control unit 200. Interrupt requests generated by the computer system 100 are received by interrupt register 201, which indicates the presence of a particular type of interrupt request by setting a corresponding particular bit position in the interrupt register $201_n$. For example, and without limitation, the IBM System/390 computer system utilizes bit positions in control registers which are set to indicate the presence of a pending interrupt request. In conjunction with the setting of bits in the interrupt register 201, the interrupt controller 200 provides an interrupt mask register 202 which may be used to selectively enable or disable pending interrupt requests as represented by the status of the bit positions in the interrupt register $201_n$. The contents of the interrupt register 201 and the interrupt mask register 202 are applied to the logical AND gate 203 so as to pass along only those pending interrupt requests that are not disabled by the interrupt mask stored in the interrupt mask register 202. For example and without limitation, by storing a logic zero value in the interrupt mask register $202_n$ in a bit position corresponding to a bit position that has been set to logic one in the interrupt 1 register $201_n$ by a pending interrupt request, the output of the AND gate $203_n$ for that bit position will have a logic zero value indicating no pending request, thereby effectively disabling that particular type of interrupt request. The output of AND gate 203 is applied to prioritizing unit 204 which designates an order of precedence for multiple co-pending non-masked interrupt requests. As previously discussed, the prioritizing unit 204 may implement, for example, pre-emptive priority or first-come first-serve priority to determine the order in which a plurality of co-pending non-masked interrupt requests will be handled by the CPU 101.

Upon prioritizing the pending interrupt requests, the highest priority request is passed to AND gate 205 which receives an additional input from the master mask 206. The master mask 206 is a mechanism, typically a latch with inputs that are under system control, which when set, permits any pending interrupt request that has not been masked by the interrupt mask register 202 to be masked. By way of example and without limitation, if an I/O interrupt request is passed through prioritizing means 204 and input into AND gate 205, this pending interrupt request may still be masked from the CPU 101 if the master mask latch 206 is set so as to output a logic zero. As will be subsequently described herein, a modification of the function of the typical master mask latch 206 design may be implemented to provide many of the advantages of the present invention. The output of AND gate 205 is the resultant interrupt status for the system. If a pending, highest priority interrupt request is not masked, it will pass through AND gate 205, and subsequently an interrupt request will be registered at CPU 101. If the output of AND gate 205 is such that no interrupt request is to be sent to CPU 101 due either to the lack of a pending interrupt request or to the interrupt mask register 202 or master mask latch 206, a system error interrupt request indicating a serious system level malfunction may still trigger an interrupt request to the CPU 101 via the error interrupt line 207 which is input along with the output line from AND gate 205 to OR gate 208 which stages interrupt request to the CPU 101. Accordingly, if either an unmasked highest priority pending interrupt request or a system error interrupt request condition is present, the interrupt controller 200 will signal an interrupt request to the CPU 101.

In accordance with the foregoing description of the implementation of the exemplary interrupt controller 200, it may be appreciated that programmable control of the master mask latch 206 is a desirable feature. For example, a programmer may wish to ensure the atomicity of a set of operations by disabling all manner of interrupt requests which may occur during the execution of these operations. Such control may be achieved by manipulating the inputs to the master mask latch 206 so as to permit the user to issue instructions which set and reset the latch. Enabling user programmable control in addition to system control of the master mask latch 206 may however prove problematic if errors occur during the processing of the atomic operation. In such instances, the master mask latch 206 may potentially remain set, thereby effectively disabling any and all pending interrupt requests and locking the system into its erroneous execution of the atomic operations. Accordingly, it is further beneficial to ensure that such user programmable control of the master mask includes a timeout feature so as to guard against such a system lock-out scenario.

Figure 3:
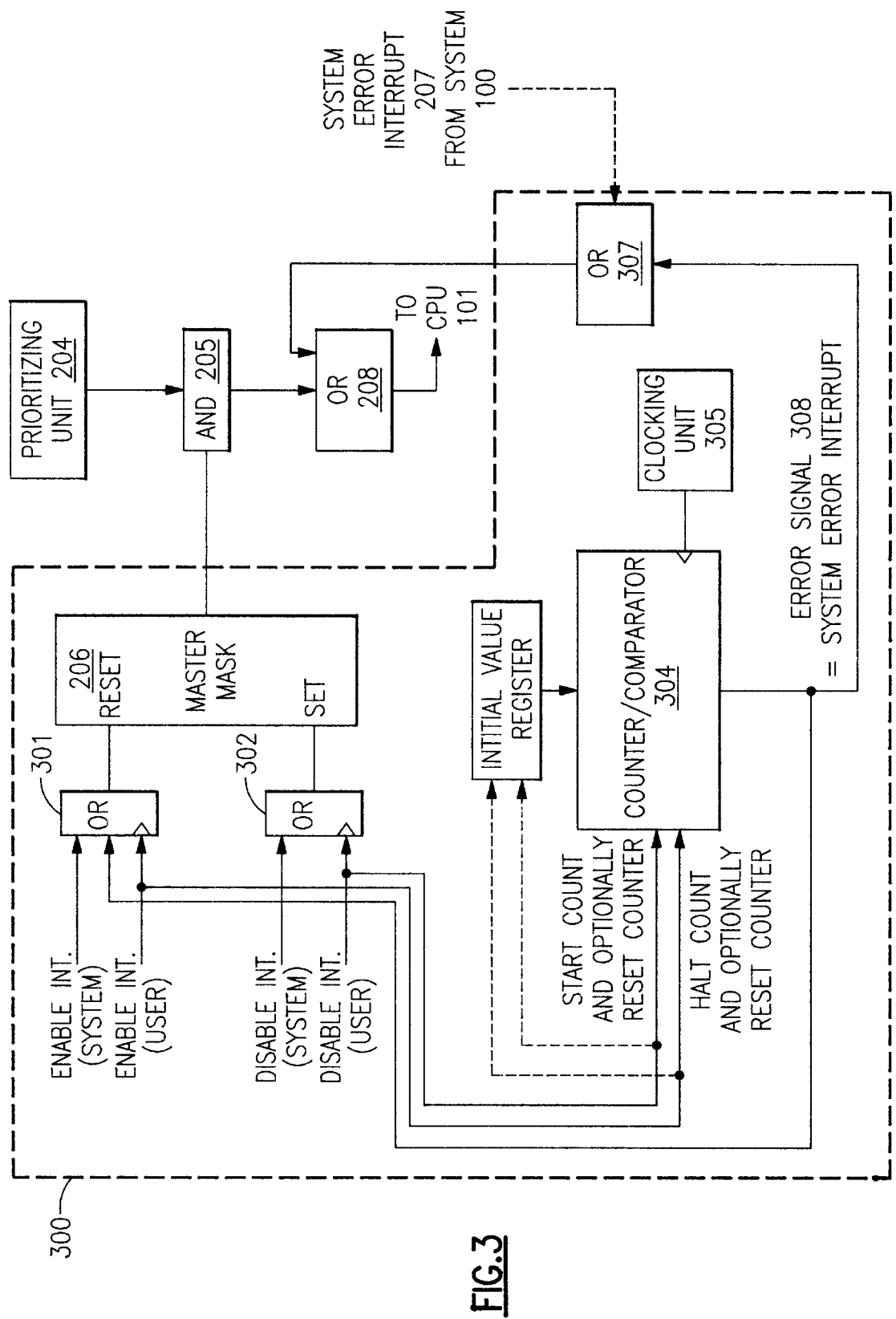
FIG. 3 Illustrates an exemplary interrupt control unit according to the present invention, having means for implementing a user programmable interrupt request mask with a timeout counter.

In accordance with these objectives in addition to providing further beneficial features, an exemplary implementation of the present invention is illustrated in FIG. 3. The user programmable mask interrupt apparatus 300 as illustrated in FIG. 3 comprises a pair of pre-input gates 301 and 302 which control input to the master mask latch 206. The pre-input gates 301 and 302 are illustrated by what of example as logic OR gates for receiving a system generated enable interrupt instruction and a user generated enable interrupt instruction at OR gate 301 and a system generated disable interrupt instruction and a user generated disable interrupt instruction at OR gate 302.

The system generated enable and disable interrupt instructions represent the privileged mechanism by which the computer system may enable or disable interrupt requests respectively via the master mask latch 206 as has been previously described herein. When the system generated enable interrupt instruction is executed it sets a logic state (either a logic one or logic zero depending upon the particular logic circuit implementation) which passes through the OR gate 301 and resets the master latch 206 which in turn provides its output to AND gate 205 which permits an interrupt request output (if one is presently pending) from the prioritization unit 204 to pass to OR gate 208 and on to the CPU 101. Alternatively, the system generated disable interrupt instruction when executed presents a logic value at OR gate 302, which passes to the master mask latch 206 thereby setting the master mask latch which in turn provides its output to AND gate 205 to disable pending interrupt requests output from prioritizing unit 204 from passing to OR gate 208.

The user generated disable interrupt instruction which may be implemented by a user created computer program, is input into OR gate 302 and in a manner similar to that described for the system generated interrupt instruction, sets the master mask latch 206 for disabling pending interrupt requests from prioritization block 204. In addition, the user disable interrupt instruction input to OR gate 302 is coupled to a counter/comparator block 304 for marking the passage of a predetermined time interval. The user disable interrupt instruction signal causes the counter/comparator 304 to initiate a count which may be clocked by clocking means 305 which in a preferred embodiment is the system clock or an independent clocking device having the same frequency as the system clock. The counter/comparator 304 sets the timeout period for user programmable interrupt masking. If the predetermined time interval passes and the interrupt mask has not been removed, the counter/comparator 304 signals this condition to the system 100 via the generation of error signal 306 which causes a system error interrupt which is input into OR gate 307 along with the system error interrupt signal from the system 100 as represented in FIG. 2. The output of OR gate 307 is sent to OR gate 208 which in turn forces any existing interrupt mask (from either the interrupt mask register 202 or the master mask latch 206) in FIG. 2 to be overridden as has been previously described with regard to system error interrupts. Moreover the error signal 306 is additionally input via OR gate 301 into the master mask latch 206 thereby resetting the latch 206 and enabling interrupt requests.

During the normal course of program execution, interrupt mask timeouts are not typical. When a user programmed enable interrupt instruction follows the disable interrupt instruction within the predetermined time period marked by the counter/comparator 304, there is no need to force a system error interrupt 305 as described above. Accordingly, the user enable interrupt instruction incident upon or gate 301 serves not only to reset the master mask latch 206 as previously described, but also to halt and reset the counter/comparator 304. As illustrated in FIG. 3, the user programmable enable interrupt instruction input into OR gate 301 is additionally coupled to counter/comparator 304 such that the execution of a user programmed enable interrupt instruction removes the interrupt mask and concurrently causes the counter 304 to cease marking the predetermined timeout period. The user enable interrupt signal additionally resets the counter/comparator 304 to its predetermined value corresponding to the predetermined time interval, thereby preparing the counter to once again initiate a counting operation to mark the time interval upon the next occurrence of the user disable interrupt instruction.

It will be apparent at this point that an alternative arrangement for the apparatus may be easily achieved by configuring the user disable interrupt instruction signal to initially load the counter/comparator 304 with the predetermined value, thereby ensuring that the user disable interrupt instruction masks interrupts for no longer than allotted by the predetermined timeout interval.

Figure 4:
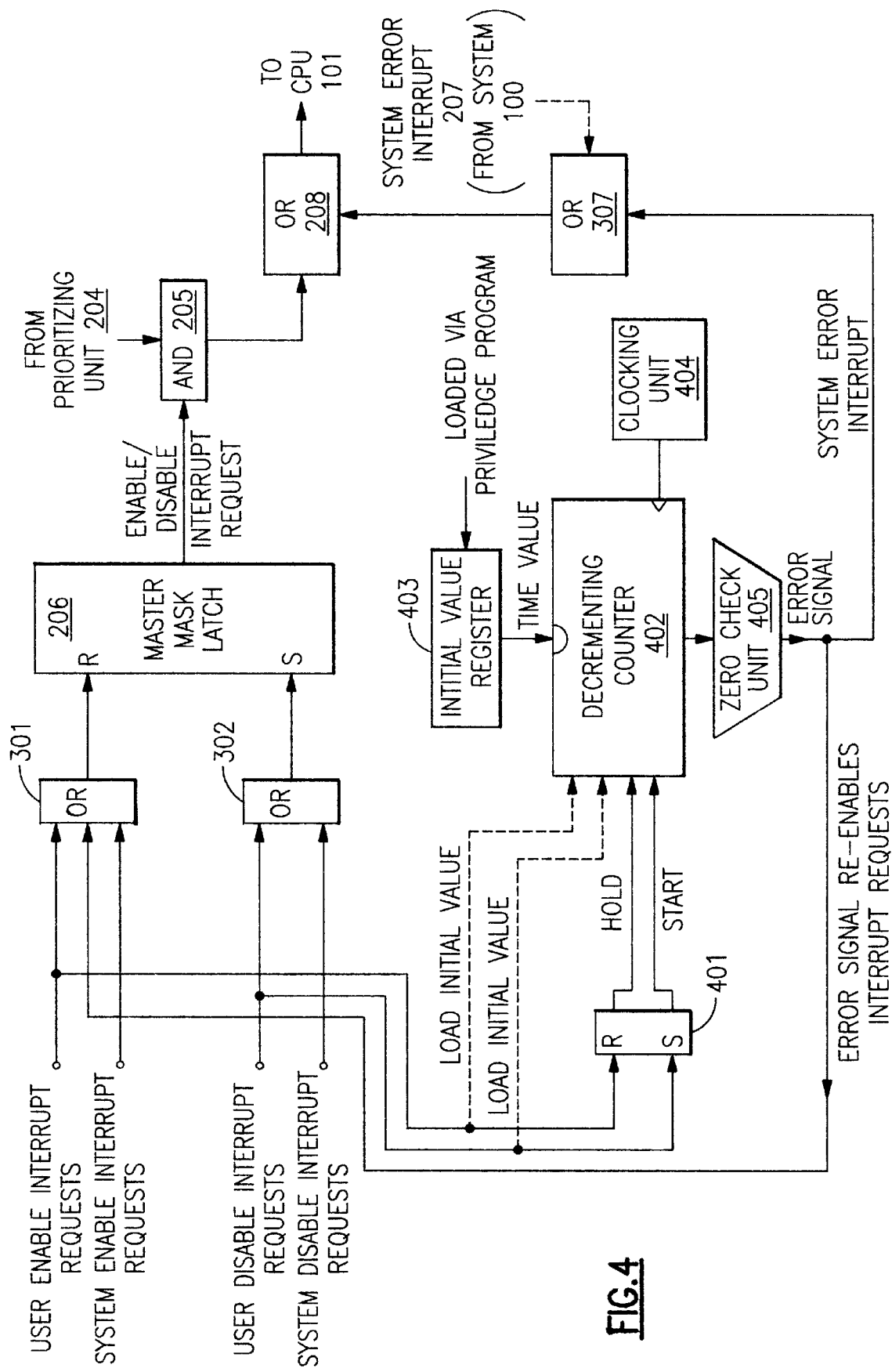
FIG. 4 Illustrates an exemplary interrupt control unit according to the present invention wherein control means for implementing the timeout feature are presented in greater detail.

A more detailed illustration of a preferred embodiment of the counter/comparator 304 is shown in FIG. 4. The user enable interrupt instruction signal is input to OR gate 301 for resetting the master mask latch 206 which in turn removes the interrupt request mask enabling pending interrupt requests to reach CPU 101 as previously described herein. In addition to enabling interrupt requests by removing the master mask, the user enable interrupt instruction in accordance with the timeout feature of the present invention must cause the counter/comparator 304 to cease counting the predetermined time interval for which the user disable interrupt instruction may disable interrupts. Thus, the user enable interrupt instruction signal is coupled to and resets the latch 401 which in turn is coupled to decrementing counter 402. The reset signal from latch 401 causes the decrementing counter to halt its count. The user enable interrupt signal is further directly coupled to decrementing counter 402 for causing the now halted counter to load an initial value corresponding to the predetermined time interval, when the user resets the master mask latch 206. The initial value, which determines the length of the predetermined timeout interval, is stored in initial value register 403 via a privileged program which is executed at the time of system initialization. The initial value register 403 is coupled to the decrementing counter 402 and provides the stored value upon a request from the counter 402 as initiated by the user enable interrupt instruction signal. As previously noted an alternative embodiment of the invention would couple the user disable interrupt signal to the decrementing counter 402 (as indicated by the dashed connection line) so as to cause the loading of the initial value from initial value register 403 at the time that the user disable interrupt instruction is executed setting the interrupt mask, disabling interrupt requests and initiating the timeout count.

It should be noted herein that in the preferred embodiment of the invention the initial value register is loaded with a system provided value indicative of the timeout period at the time of system initialization. The value stored in this register may not be made available to the user and must be fixed by the system to ensure that the timeout period is not altered to an abnormally long period of time, thereby effectively undermining the utility of coupling the interrupt mask with a timeout counter.

The user disable interrupt instruction signal which is input into OR gate 302 for setting the master mask latch 206 thereby disabling pending interrupt requests, is additionally coupled to the latch 401. The user disable interrupt signal, in accordance with the present invention, causes the master mask latch to disable interrupt requests for the predetermined timeout interval. Accordingly, the user disable interrupt instruction must concurrently initiates the counting of the predetermined time interval so as to ensure that the interrupt mask does not remain in place for too long. To accomplish this objective, the user disable interrupt instruction signal is coupled to and sets the latch 401. The setting of the latch 401 causes the decrementing counter 402 to begin a decrementing count, decreasing the initial value stored therein via the initial value register 403 with every clock pulse from the clock unit 404. As previously noted, the clock circuit is preferably the system clock or a clock circuit which generates pulses at the system clock frequency. In this manner the timeout period may be easily equated to a predetermined number of machine cycles, facilitating use of the user programmable interrupt instructions.

Upon each clock pulse from the clock unit 404, the resultant decremented value in the decrementing counter 402 is sampled via the coupled zero check unit 405 to determine if the initial value has been decremented to zero. If the decrementing counter 402 is permitted to count for the entire predetermined time interval (i.e. it is allowed to count down to zero), the mask has been left in place for too long and must be removed by the generation of a system error signal as previously described in FIG. 3. At the end of the predetermined time interval the decrementing counter 402 has decremented the initial value, loaded therein from the initial value register 403 at the time that the user disable interrupt instruction causes interrupt requests to be masked, to a value of zero. When the decremented count reaches zero, the zero check unit 405 sends a system error signal which is input as a system error interrupt request to OR gate 307 in combination with the system error interrupt from the system 100 which has its output coupled to the input of OR gate 208 which serves as the conduit for passing interrupt requests to the CPU 101. Additionally, the error signal is fed back to the OR gate 301 which serves to reset the master mask latch 206 which in turn enables interrupt requests by removing the interrupt mask. Thus, the error signal is routed through the interrupt control circuit as both a system error interrupt and as an error signal which serves to reset the master mask latch. It is worthwhile herein to note that the decrementing counter 402 with the zero check circuit 406 is described merely as an exemplary embodiment of counter/comparator 304, which in an alternative embodiment may include an incrementing counter which starts counting incrementally upward from zero or from a predetermined set off value, and a comparator which is loaded with a final value from said initial value register 403 such that upon each increment of the counter as clocked by the clocking circuit 404, the value held therein is compared against the final value thus prescribing the duration of the interrupt mask.

Figure 5:
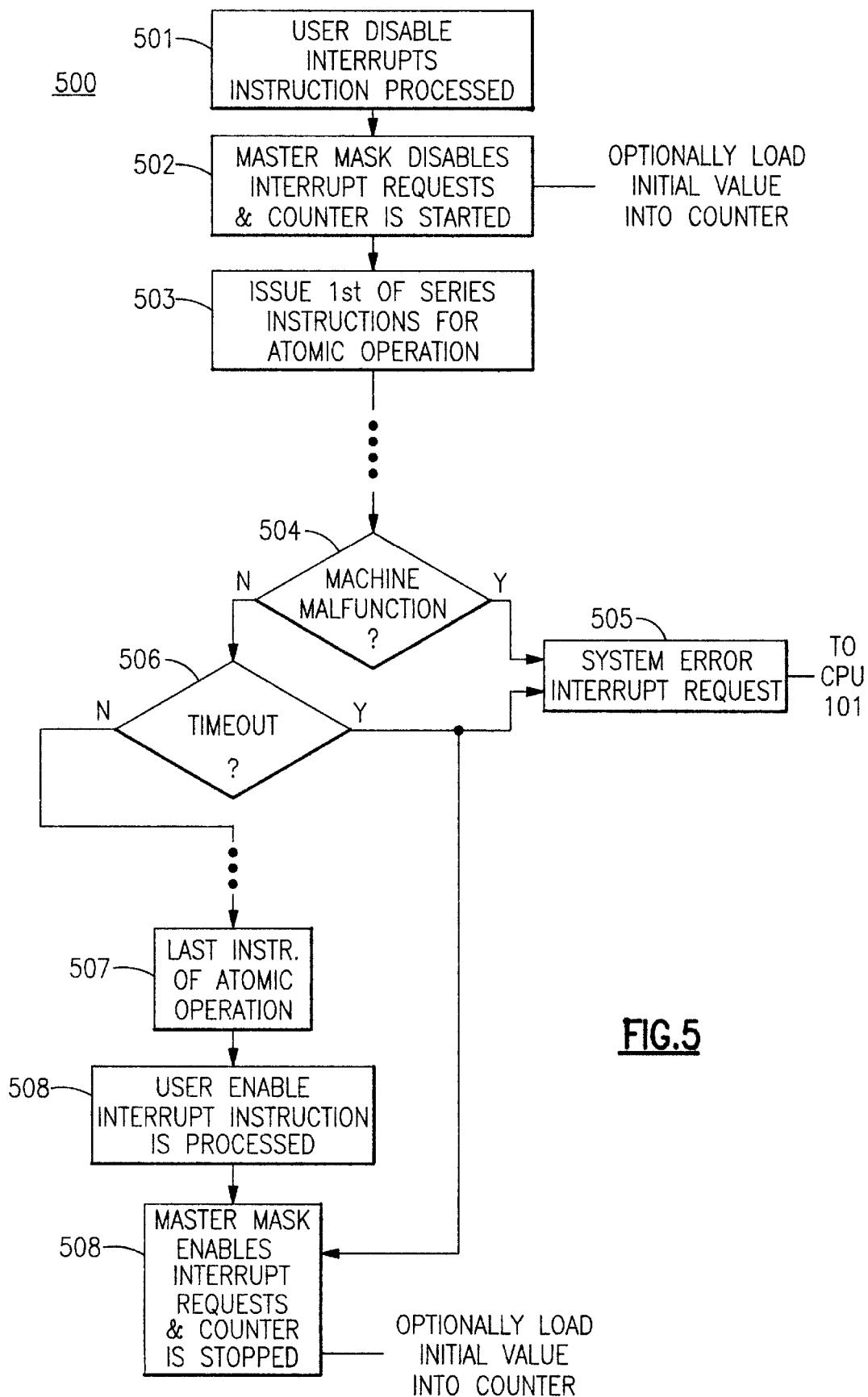
FIG. 5 Depicts by way of a flow diagram, the order of operations during the user programmed disabling and enabling of interrupt requests with the timeout feature.

In operation, a user program may issue a user disable interrupt instruction, followed by a set of instructions for which the user requires atomic execution, which in turn are succeeded by a user enable interrupt instruction which removes the master mask. FIG. 5 provides a flow diagram 500 to illustrate the steps involved in implementing the inventive user programmable enable and disable interrupt instructions with the timeout counter. At step 501 a user program issues the disable interrupts instruction, which is processed by the CPU 101 and causes the setting of the master mask latch 206 and initiates the counting of the counter/comparator 304 which is either loaded at that time with the value representing the predetermined interval or which has previously been loaded with the value upon the prior user enable interrupt instruction, as has been previously described. Next at step 502 all interrupt requests with the exception of system error interrupt requests are masked from the CPU 101 by the master mask latch 206 and the counting of the counter/comparator 304, which has been loaded with the initial value for counting the timeout period, has begun. At step 503 the user program issues the first of one or more instructions for which atomic execution is desired, once again these instructions will proceed uninterrupted unless a system error interrupt request resulting from a machine malfunction 504 occurs during their execution. If a system error interrupt request occurs during execution of these instructions, the CPU 101 will process the request 505 and the atomic instructions execution will be interrupted, otherwise they will proceed unimpeded. During the course of the execution of the atomic operation, prior to execution of the last atomic instruction 507, if the counter/comparator 304 counts the entire predetermined interval, a timeout occurs 506 which in turn forces a system error interrupt request to be generated 505, which is processed by CPU 101. Additionally, the timeout forces the master mask latch 206 to enable interrupt request, stops the counting of the counter/comparator 304 and optionally loads the initial value into the counter/comparator for a subsequent interrupt mask, as in step 509. Alternatively, if all of the instructions of the desired atomic operation have competed 507 prior to the occurrence of the timeout 506, a user programmed enable interrupt instruction is executed 508. The user programmed enable interrupt instruction causes the master mask latch 206 to reset and this in turn allows interrupt requests to be received at CPU 101 as previously described 508. In conjunction with re-enabling interrupt requests, the enable interrupt instruction causes the counter/comparator 304 to stop counting 509 and may, in alternative embodiments, cause the initial value corresponding to the predetermined time interval to be loaded into the counter/comparator for use at the next instance of the user programmed interrupt instruction.

A class of operations for which atomic execution is typically desired are known as "read-modify-write" operations, in which data is accessed from a portion of shared storage, is modified by performing operations upon it, and the resulting data is written back to the previously accessed storage location. With these read-modify-write operations it is desirable to ensure that the storage location from which the data is accessed is not subsequently accessed by the system, prior to the storage of the modified data therein. Accordingly, certain mechanisms exist for implementing a resource locking scheme so as to serialize access to the shared resource. Examples of locking schemes for such atomic read-modify-write operations include the test and set operation: in which a byte of data is tested to determine if a storage location of a shared data storage resource is currently being accessed by other programs or processors and if the byte indicates that the data structure is available it is set to a new status condition (for example it may be set from 0s to 1s) upon access by the processor performing the test; and the compare and swap or compare and double swap operations: in which the contents of a register are compared against a known value (such as a processor ID) to determine whether a shared data storage structure is currently being accessed and if it is not, the processor ID of the comparing processor is swapped into the tested register indicating current access of the shared data storage structure. Without such mechanisms to ensure that the data stored in the accessed storage location is correct, the system could easily propagate corrupted data. By implementing the read-modify-write operations so that operations occur atomically, the user in turn ensures that the data integrity of the system is maintained.

In single processor systems, atomicity via read-modify-write instructions is typically only a problem with concurrently executing programs. The single processor sequentially executes each step in the read-modify-write operations and the data in the storage location is not accessed during this time interval by other processors within the system, thus atomicity is typically ensured. Multiprocessing systems present a more challenging problem. In multiprocessing systems, the storage device may be accessed independently by any of the plurality of system processors. Typically, such multiprocessing systems employ hardware or software based resource locking schemes such as those previously described to achieve atomicity for read-modify-write operations. In such systems, interrupt masking as described herein may be further implemented to ensure that operations are performed atomically and, by virtue of the previously described timeout function, to further ensure that resources are not permanently disabled if errors occur during the implementation of these atomic operations.

A particular embodiment of the present invention may be implemented in a reduced instruction set computer system (RISC). RISC systems are typically designed in such a manner that instructions must be executable within a single machine cycle. This limitation presents a problem when a user wishes to implement the aforementioned atomic read-modify-write operations wherein data stored in a shared storage location is accessed, modified and rewritten. The aforementioned resource locking schemes present particular problems in RISC systems since they are multicycle operations and typically require very complex hardware controls to implement. Accordingly, RISC programmers have opted for a series of single machine cycle instructions which accomplish the desired read-modify-write operation. The commonly used instructions are fetch and hold instructions followed by store and release instructions, or fetch and reserve instructions followed by a conditional store instruction.

In operation, each of these series of instructions may be thought of as performing a three step, multiple machine cycle operation. In the case of the fetch and hold, store and release series of instructions, the system by way of the RISC processor(s) (i.e. CPU 101): (1) reads data from a designated shared storage location and locks that location from other access in a first machine cycle; (2) executes any modify instructions which change the value of the fetched data in a second and subsequent machine cycles; and (3) stores the modified data in the designated locked storage location and releases the lockout of that location in the final machine cycle. In the case of the fetch and reserve, conditional store series of instructions, the system (1) reads the data from a designated shared storage location and requests that location be locked in a first machine cycle; (2) executes any modify instructions which change the value of the fetched data in a second and subsequent machine cycles; and (3) stores the modified data in the designated storage location upon the condition that the requested lockout of that location in step 1 has been granted in a final machine cycle. If lockout has not been granted the system will not attempt to store the modified data, and will typically return to execution of step 1. This second series of instructions requires the implementation of sophisticated cache coherence hardware to ensure proper execution. Moreover, interrupts occurring during either the first series of instructions or the second series of instructions, increase the amount of time that the system storage remains locked, which consequently creates a need for more extensive locking hardware or results in a system with a substantial portion of its storage resource locked.

By combining these RISC instructions with the principles of the present invention, it is possible to implement a series of instructions which may be processed by a RISC processor 101 wherein a single machine cycle instruction may read and lock a shared storage location while concurrently disabling interrupt requests and setting a timeout counter as in the current user disable interrupt instruction, while another single machine cycle instruction may store modified data into the shared storage location, release the lock, and concurrently re-enable interrupt requests and reset the timeout counter as in the previously described user enable interrupt instruction. The user programmable disable and enable interrupt portions of these single cycle instructions would operate in the same manner as previously described via reference to FIG. 3 through FIG. 5.

Figure 6:
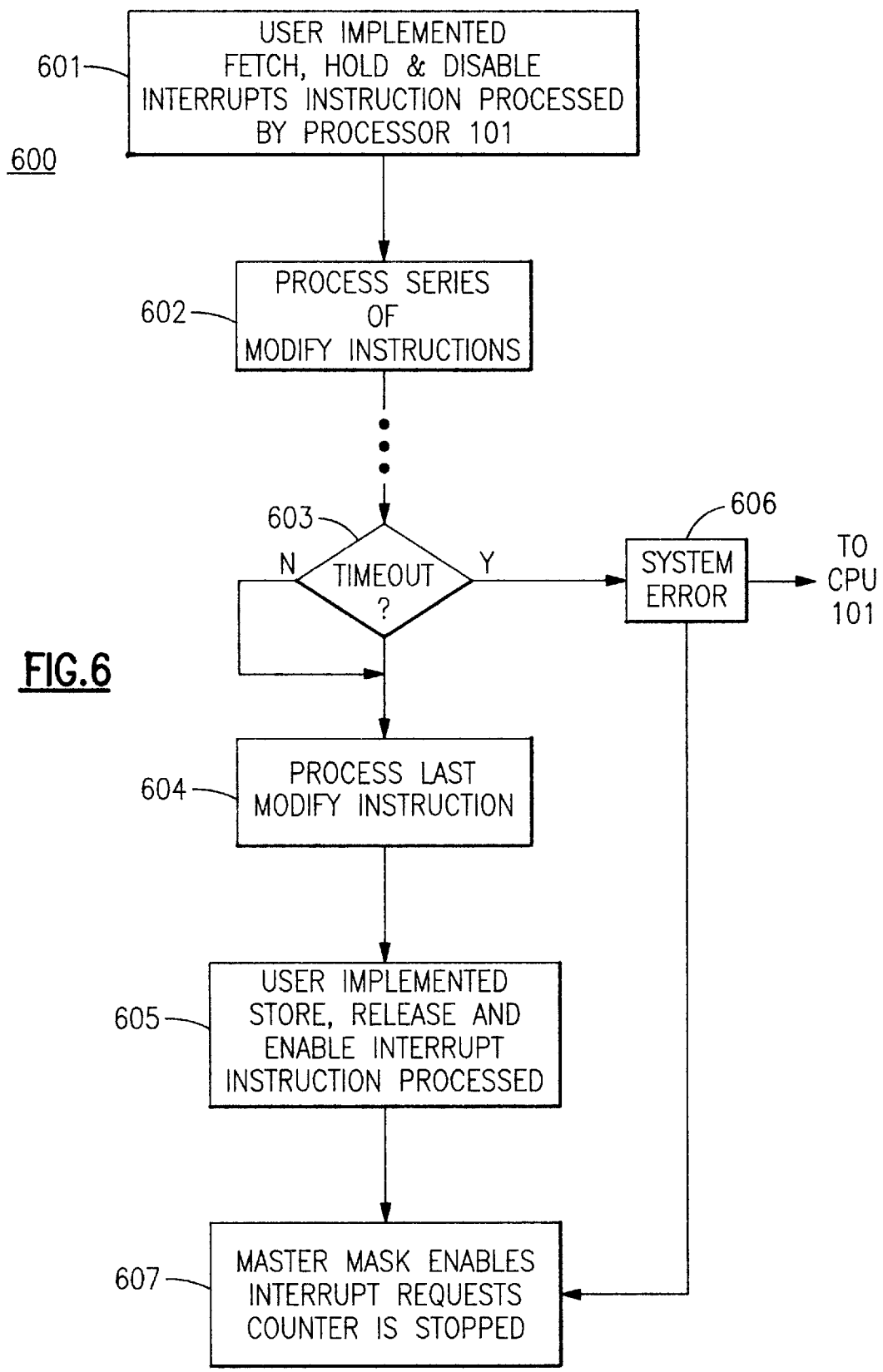
FIG. 6 Illustrates by way of a flow diagram, the implementation of an exemplary Fetch, Hold, Disable Interrupts with Timeout instruction and a Store, Release, Enable Interrupt instruction.

Referring now to FIG. 6, a flow diagram 600 details the series of instructions for implementing an atomic read-modify-write operation with a user programmable masked interrupt with timeout in a RISC system. In the first step 601 the user implements a fetch, hold and user disable interrupt instruction which is processed by the RISC processor 101 in the first machine cycle. This instruction reads data from the shared storage locations, places a lock on the accessed shared storage location and concurrently sets the master mask latch 206 effectively disabling all but system error interrupt requests from the RISC processor 101. Additionally, the instruction initiates the counting of the counter 402, as checked by the zero check unit 405, to ensure that the interrupt mask does not remain in place for too long. In this case the value loaded into the counter 402 from the initial value register 403 must correspond to the expected duration of the particular atomic read-modify-write operation. Next in step 602 the RISC processor 101 executes the first of the sequence of modify instructions which change the value of the fetched data in a second and subsequent machine cycles. During the execution of the modify instructions, the counter 402 as clocked by the clock unit 404 continues to mark the time interval for which the interrupt mask is in place. If the counter 402 counts past the loaded initial value corresponding to the expected duration of the particular atomic read-modify-write operation 603, a the zero check unit 405 will generate a system error 606 as previously described with regard to FIG. 4, thereby removing the user implemented interrupt mask by enabling interrupt request, and resetting the counter 607. Alternatively, if the processing of the any of the modify instructions 602 does not exceed the timeout interval execution of the succeeding modify instructions 602 continues until the last modify instruct has been processed at step 604. After the processing of the final modify instruction 604 processing proceeds to step 605 wherein the modified data is stored in the locked shared storage location reference in step 601, the lock is removed making the shared storage resource accessible to the system 100, and the user enable interrupt instruction is concurrently executed in the final machine cycle of the atomic read-modify-write operation 607. As previously described, the user enable interrupt instruction resets the master mask latch 206 thereby allowing pending interrupt requests to reach CPU 101 and halts the timeout count of counter 402 to prevent the generation of the system error interrupt via zero check unit 405.

Although detailed descriptions of the preferred embodiments have been provided herein, it will be understood that those skilled in the art, both now and in the future, may make various adaptations, modifications, improvements and enhancements which all fall within the scope of the invention claimed hereafter. These claims should be construed so as to maintain the proper protection for the invention first disclosed.

Having thus described my invention, what I claim as new and desire to protect by Letters Patent is as follows:

1. An interrupt control apparatus which is capable of being coupled to a processing unit for creating interruptions in the sequential processing of the processing unit, the interrupt control apparatus comprising:

an interrupt master mask for disabling interrupt requests;

a timeout counter coupled to said interrupt master mask for limiting the duration of said disabling of interrupt requests by the interrupt master mask;

means for receiving a non-privileged interrupt masking instruction at said interrupt master mask for causing said interrupt master mask to disable interrupt requests, and for causing said timeout counter to begin counting for a set time period, said set time period defining the duration of the disabling of interrupt requests by said interrupt master mask; and means for receiving a non-privileged remove interrupt masking instruction at said interrupt master mask for causing said interrupt master mask to enable interrupt requests, and for stopping the counting of said timeout counter if said timeout counter has not counted beyond said set time period;

wherein if said timeout counter counts past said set time period, said timeout counter signals an error, said signalled error causing said interrupt master mask to enable interrupt requests.

2. An interrupt control apparatus according to claim 1 further including an initial value register coupled to said timeout counter for loading in said timeout counter a set time value corresponding to said set time period.

3. An interrupt control apparatus according to claim 2 wherein said initial value register is loaded with said set time value via a privileged program at system initialization time.

4. An interrupt control apparatus according to claim 2 wherein said receiving of the non-privileged interrupt masking instruction at said interrupt master mask further causes said initial value register to load said set time value into said timeout counter.

5. An interrupt control apparatus according to claim 2 wherein said receiving of the non-privileged remove interrupt masking instruction at said interrupt master mask further causes said initial value register to load said set time value into said timeout counter.

6. An interrupt control apparatus according to claim 1 further comprising a comparator logic unit coupled to said timeout counter for comparing the count of the timeout counter to said set time value to determine if said timeout counter has counted past said set time period.

7. An interrupt control apparatus according to claim 6 wherein if said timeout counter has counted past said set time period, said comparator logic unit generates an error signal.

8. An interrupt control apparatus according to claim 7 wherein said generated error signal indicates a system error interrupt to said processing unit.

9. An interrupt control apparatus according to claim 7 wherein said generated error signal is input to said interrupt master mask for causing said interrupt master mask to enable interrupt requests, and for stopping the counting of said timeout counter.

10. An interrupt control apparatus according to claim 1 further including a clocking unit coupled to said timeout counter for stepping the count of said timeout counter.

11. An interrupt control unit according to claim 10 wherein said clocking unit maintains the frequency of the system clock.

12. A method of operating an interrupt control apparatus which is capable of being coupled to a processing unit for creating interruptions in the sequential processing of the processing unit, the method comprising the steps of:

receiving a non-privileged interrupt masking instruction at an interrupt master mask for causing said interrupt master mask to disable interrupt requests, and for causing a timeout counter coupled to said interrupt master mask to begin counting for a set time period, said set time period defining the duration of the disabling of interrupt requests by said interrupt master mask;

receiving a non-privileged remove interrupt masking instruction at said interrupt master mask for causing said interrupt master mask to enable interrupt requests, and for stopping the counting of said timeout counter if said timeout counter has not counted beyond said set time period; and wherein if said timeout counter counts past said set time period, said timeout counter signals an error, said signalled error causing said interrupt master mask to enable interrupt requests.

13. A method according to claim 12 wherein said interrupt control apparatus further includes an initial value register coupled to said timeout counter for loading in said timeout counter a set time value corresponding to said set time period and wherein said method further includes the step of loading said initial value register with said set time value via a privileged program at system initialization time.

14. A method according to claim 13 wherein said step of receiving the non-privileged interrupt masking instruction at said interrupt master mask further causes said initial value register to load said set time value into said timeout counter.

15. A method according to claim 13 wherein said step of receiving the non-privileged remove interrupt masking instruction at said interrupt master mask further causes said initial value register to load said set time value into said timeout counter.

16. A method according to claim 12 wherein said interrupt control apparatus further includes a comparator logic unit coupled to said timeout counter said method further including the step of comparing the count of said timeout counter to said set time value to determine if said timeout counter has counted past said set time period.

17. A method according to claim 16 further including the step of generating an error signal at said comparator logic unit if said timeout counter has counted past said set time period.

18. A method according to claim 16 wherein said generated error signal indicates a system error interrupt to said processing unit.

19. A method according to claim 17 further including the step of inputting said generated error signal into said interrupt master mask for causing said interrupt master mask to enable interrupt requests, and for stopping the counting of said timeout counter.

20. A method according to claim 12 further including the step of clocking the count of said timeout counter via a clocking unit coupled to said timeout counter wherein said clocking unit maintains the frequency of the system clock.

\* \* \* \* \*